Feb. 2, 1932.   H. C. SCHLICKER   1,843,650
WINDING AND REWINDING MECHANISM FOR PICTURE PROJECTORS
Filed April 11, 1928   6 Sheets-Sheet 1
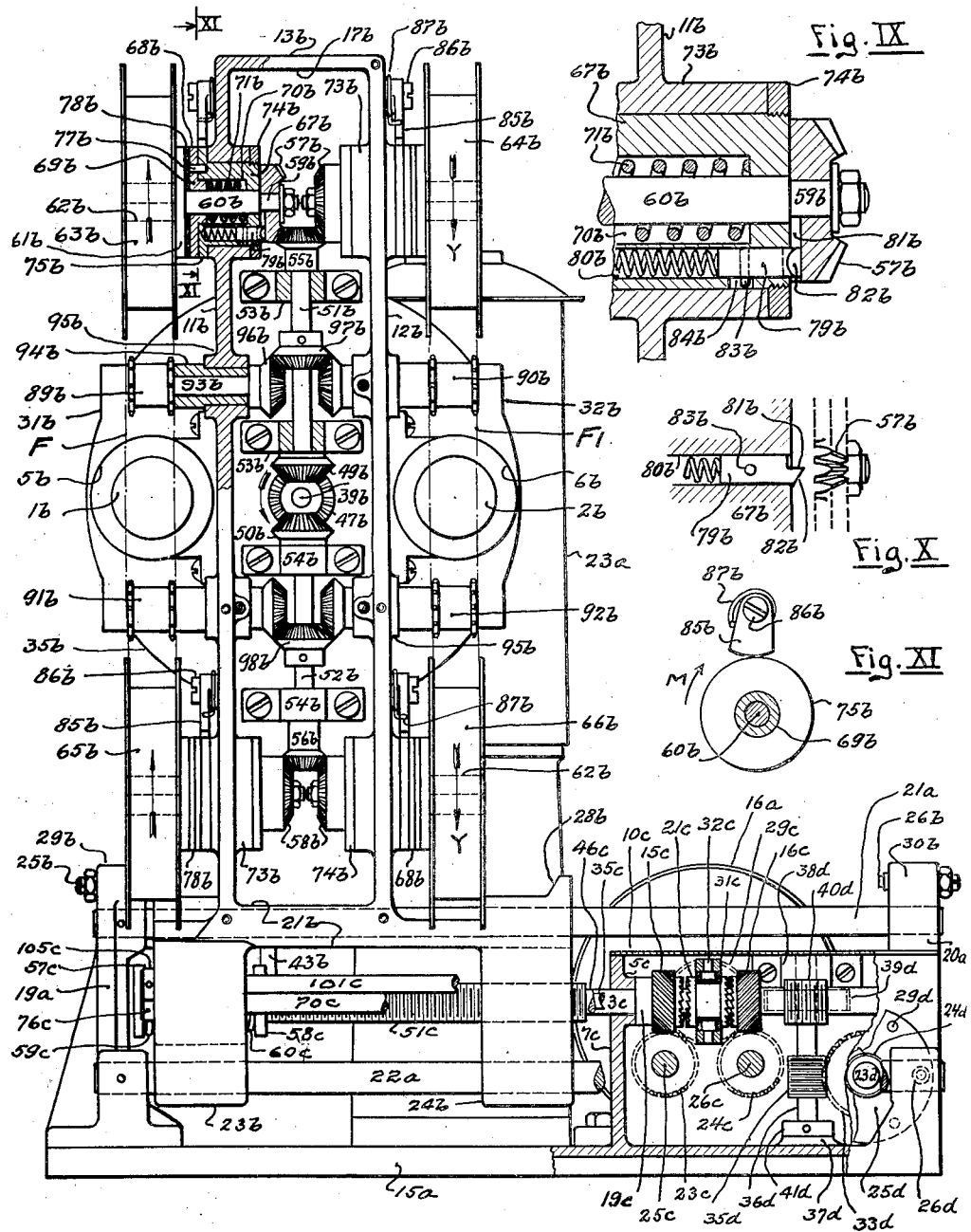
Fig. I
Inventor
Herman C. Schlicker
By his Attorney
H C Karlson

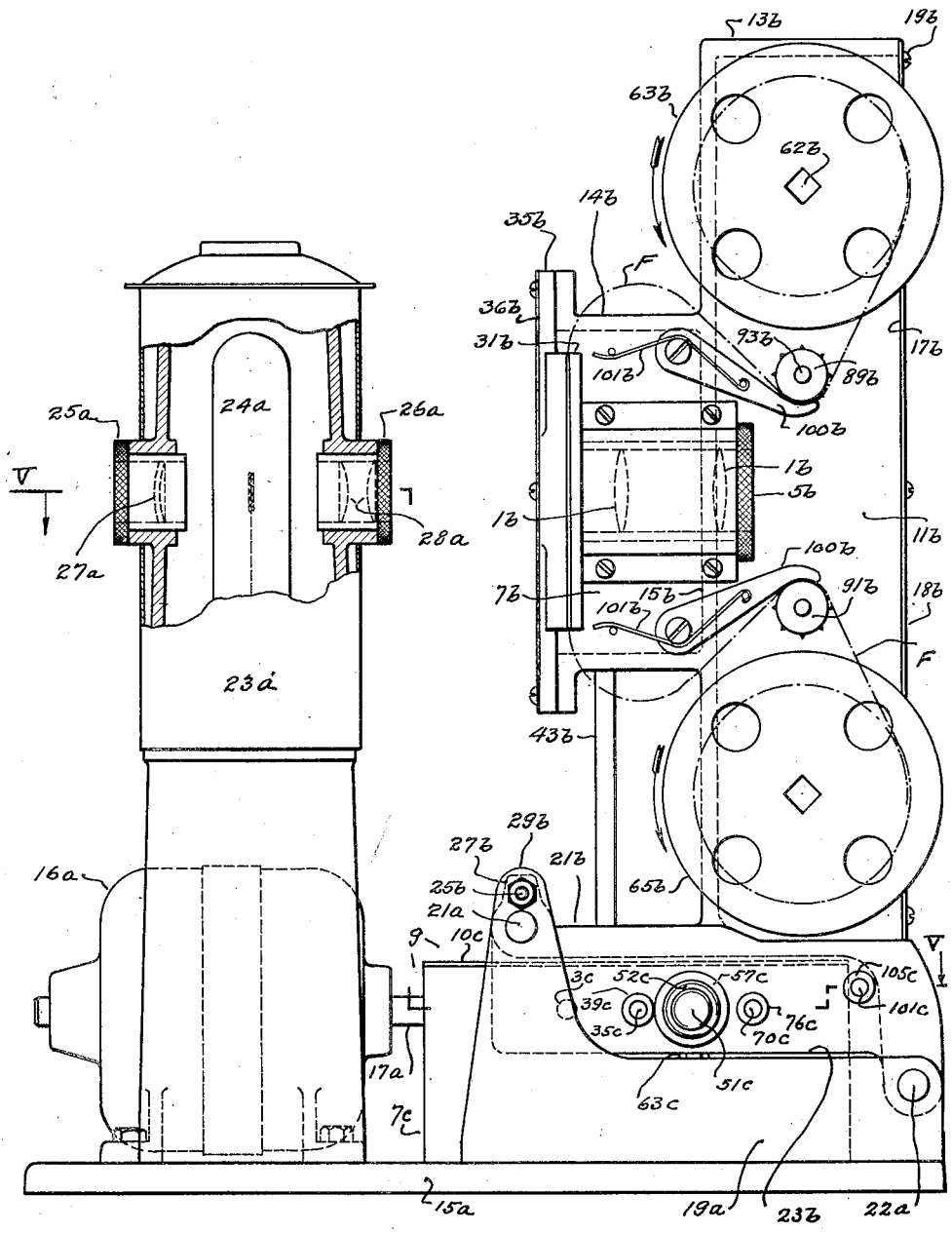
Fig. II

Feb. 2, 1932.  H. C. SCHLICKER  1,843,650
WINDING AND REWINDING MECHANISM FOR PICTURE PROJECTORS
Filed April 11, 1928   6 Sheets-Sheet 3
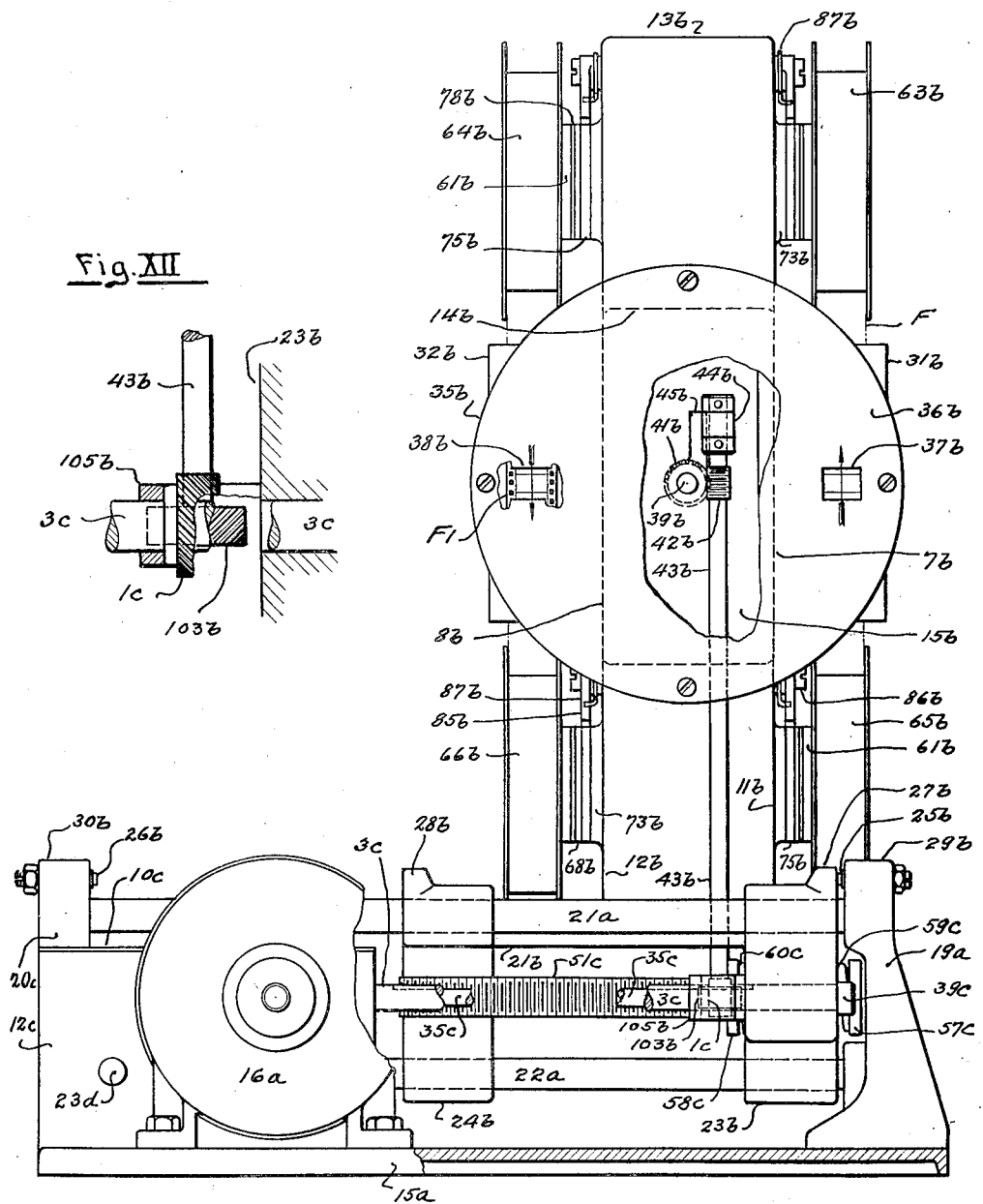
Fig. XII
Fig. III
Inventor
Herman C. Schlicker
By his Attorney
H C Karlson Feb. 2, 1932. H. C. SCHLICKER 1,843,650
WINDING AND REWINDING MECHANISM FOR PICTURE PROJECTORS
Filed April 11, 1928 6 Sheets-Sheet 4
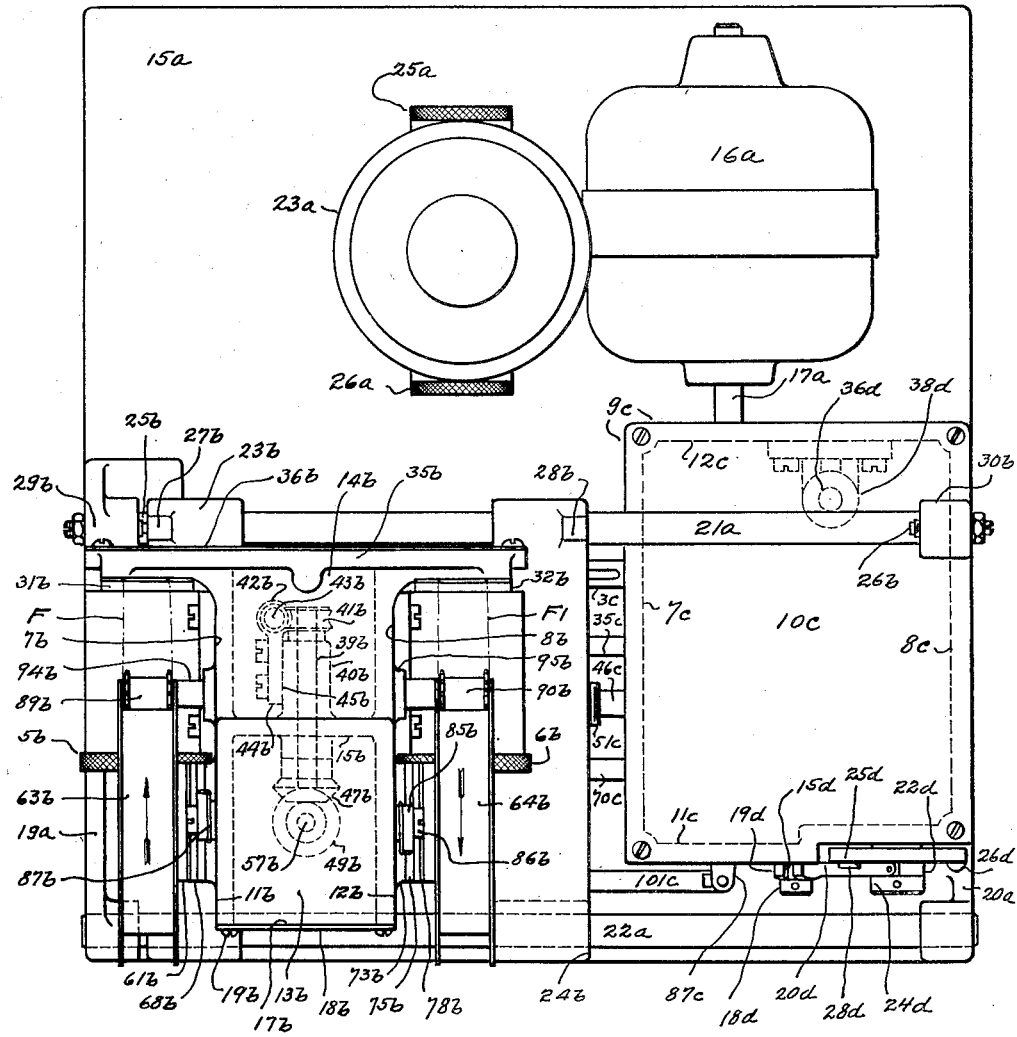
Fig. IV
Inventor
Herman C. Schlicker
By his Attorney
H C Karlson Feb. 2, 1932. H. C. SCHLICKER 1,843,650
WINDING AND REWINDING MECHANISM FOR PICTURE PROJECTORS
Filed April 11, 1928 6 Sheets-Sheet 5
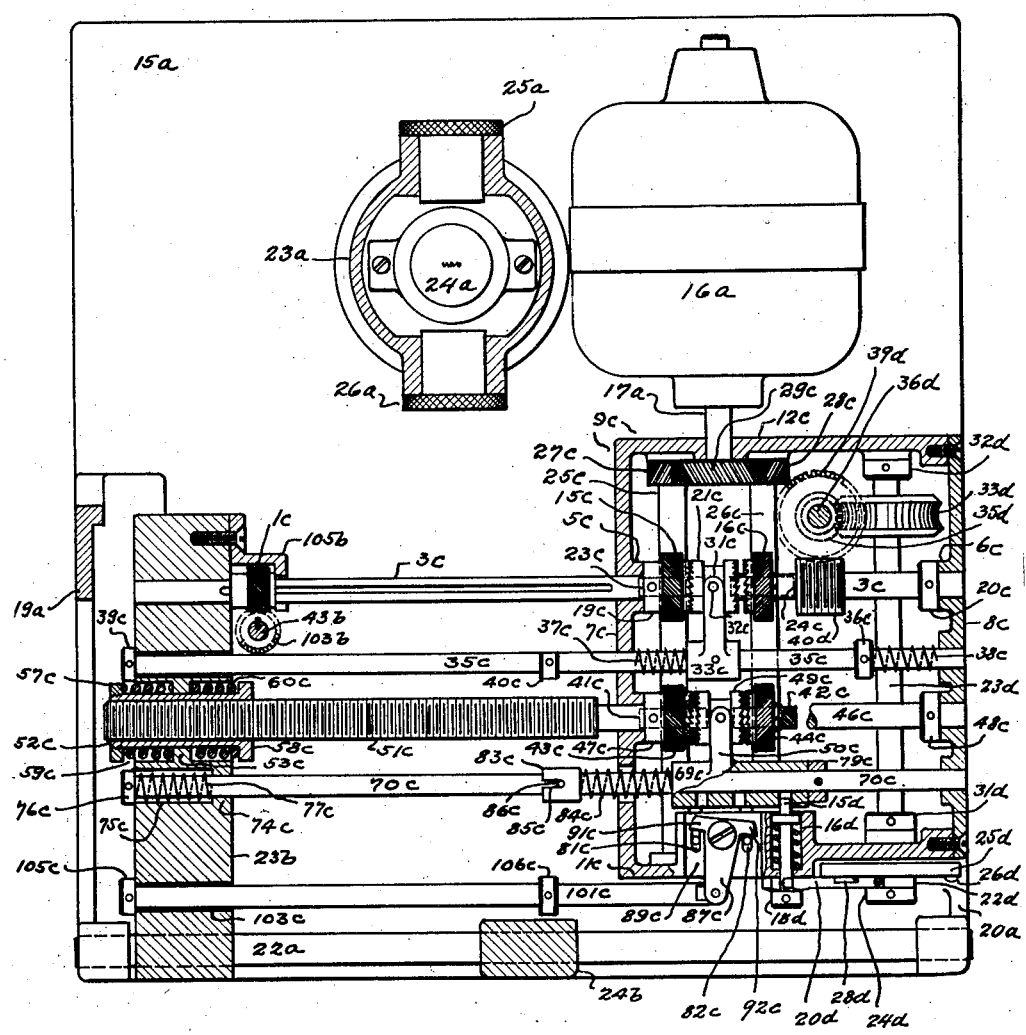
Fig. V
Inventor
Herman C. Schlicker
By his Attorney
H C Karlson Feb. 2, 1932. H. C. SCHLICKER 1,843,650
WINDING AND REWINDING MECHANISM FOR PICTURE PROJECTORS
Filed April 11, 1928 6 Sheets-Sheet 6
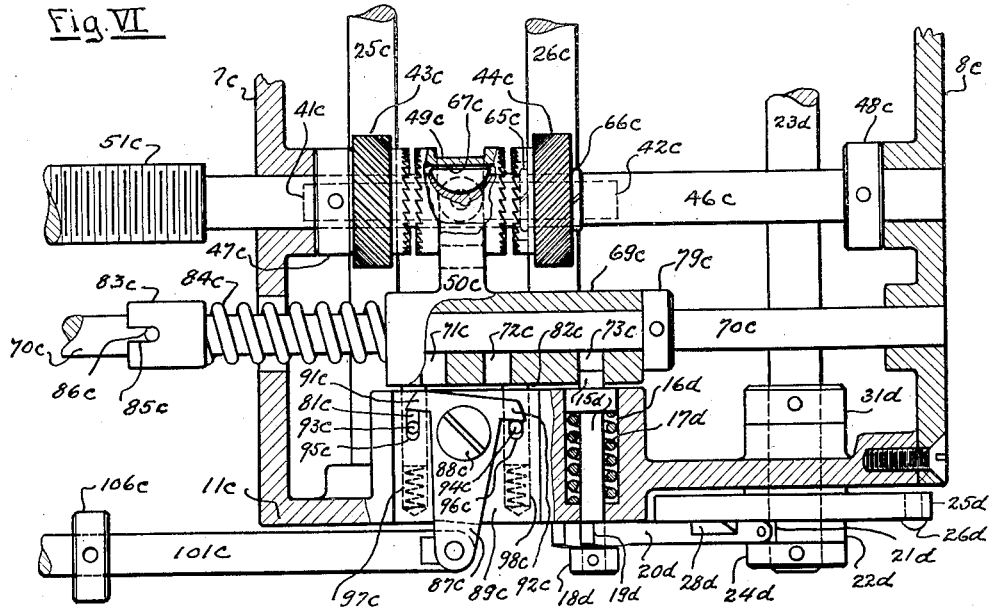
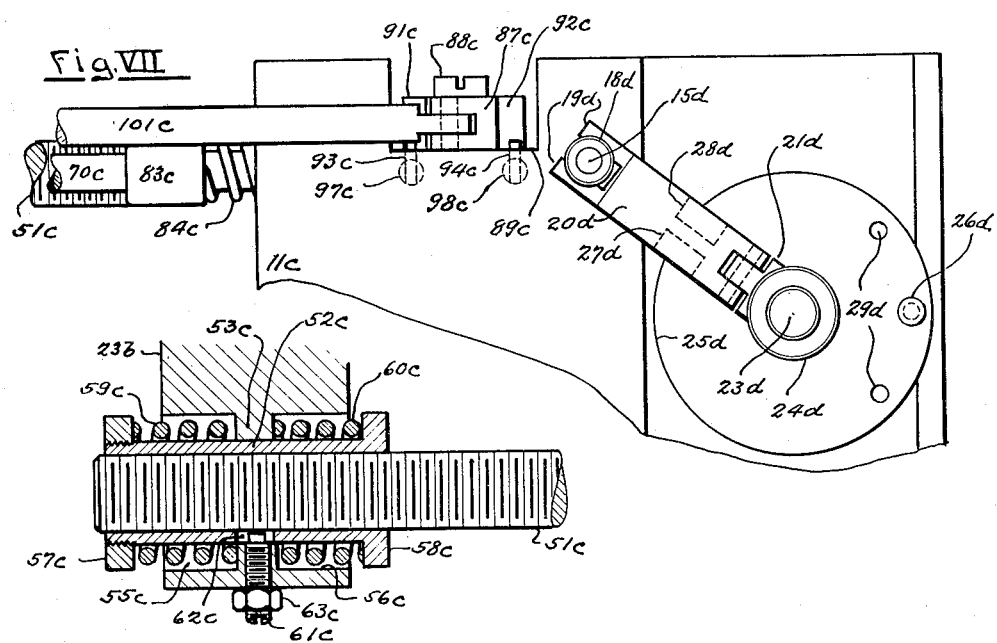
Inventor
Herman C. Schlicker
By his Attorney Patented Feb. 2, 1932

1,843,650

UNITED STATES PATENT OFFICE

HERMAN C. SCHLICKER, OF BROOKLYN, NEW YORK

WINDING AND REWINDING MECHANISM FOR PICTURE PROJECTORS

Application filed April 11, 1928. Serial No. 269,219.

The present invention relates to winding and rewinding mechanisms for picture projectors, and appertains more especially to such devices wherein a pair of film tapes are projected alternately and continuously to present the images thereon automatically and in sequence.

An important feature of the invention is that reversal and re-winding of the films in opposite directions, is performed by positively acting mechanical means.

Another feature consists in providing novel and reliable timing mechanism for controlling the film movements.

A further feature resides in producing improved means for reversing the motion of the films, the action of which may be predetermined in accordance with the number of images to be exposed; that is, in accordance with the length of the film tape.

Still another feature is found in the utilization of a separate projecting lens for each film-tape in order to avoid disturbing the adjustment between the film and lens.

A still further feature is the provision of a compensator which will store up and give out when needed, power applied thereto in reverse directions.

An additional feature is the furnishing of correlated releasing, setting and locking instrumentalities for the mechanism that effects the shifting of a carrier for the films.

Briefly stated, the object of the invention is to produce an improved device for the purposes implied, which shall be of simple and practical construction; composed of a minimum number of small parts, severally characterized by strength, durability and facility of assemblage, as well as amenable to low manufacturing costs.

Other objects and advantages of the invention will become apparent as the specification proceeds.

With the aforesaid objects in view, the invention consists of the novel combinations and arrangements of parts hereinafter described in their preferred embodiments, pointed out in the subjoined claims and illustrated in the annexed drawings, wherein like parts are designated by the same reference characters throughout the several views.

Generally described, the invention under consideration includes in its organization, a base whereon is sustained a prime-mover; a light source; mechanism for distributing and converting motion transmitted thereto by the prime-mover; and a support guiding a carrier for sets of reels for double tape films. Means mounted on the carrier enables continuous and alternate winding and unwinding of the films in relatively opposite directions. Combined with an element for translating the aforesaid carrier on its support is a compensating device which acts at the end of the travel of the carrier to position one or the other of a pair of projecting lenses co-operating with the films in proper focus relatively to the condensing lens associated with the light source. Correlated with the first named mechanism, are instrumentalities for predetermining the periods of rest, and motion in either direction of the carrier.

The advantages of the invention as here outlined are best realized when all of its features and instrumentalities are combined in the one and same structure, but, useful devices may be produced embodying less than the whole.

It will be obvious to those skilled in the art to which the invention appertains, upon becoming conversant with the details thereof, that the same may be incorporated in several different constructions. The accompanying drawings, therefore, are submitted merely as showing the preferred exemplification of the invention.

In the said drawings:—

Figure I is a front view of this improved winding and rewinding mechanism, some parts being shown in section and other parts omitted;

Fig. II is a side view, looking from the left towards the right of the preceding figure, some parts being in section;

Fig. III is an elevation looking from the rear of Fig. I, some parts being broken away;

Fig. IV is a top plan view;

Fig. V is a horizontal section, taken on the irregular line V—V of Fig. II, looking down thereon;

Fig. VI is a fragmentary plan view, showing the lower right-hand portion of Fig. V, on an enlarged scale;

Fig. VII is a front view of the parts shown in Fig. VI, looking in an upward direction thereon;

Fig. VIII is an enlarged sectional elevation of a compensating device, appearing at the left-hand side of Fig. V;

Fig. IX is an enlarged sectional elevation of a one-way driving mechanism shown at the upper left-hand side of Fig. I;

Fig. X is a fragmentary side elevation of some of the parts appearing in Fig. IX;

Fig. XI is a section on the line XI—XI of Fig. I, looking in the direction of the arrows, and showing a friction pawl or braking device; and Fig. XII is a fragmentary side elevation of a motion transmitting gearing, appearing at the lower right-hand portion of Fig. III, and also at the left-hand side of Fig. V.

Referring now to these views for a detailed description of the invention, the numeral "15a" denotes a base or bed-plate, adapted to rest on a suitable primary support. To the rear of this base, as viewed in Figs. IV and V, is fastened in any appropriate manner, a prime-mover 16a, which for convenience may consist of a small electric motor, having a driving shaft 17a. From the opposite side or lateral edges, in proximity to the front of base 15a, extend up supports 19a, 20a, in and between which are sustained a pair of guides, that may be in the nature of longitudinally parallel, but vertically staggered bars 21a, 22a (Fig. II). On the aforesaid guide bars is slidable a carriage 21b, more fully hereinafter referred to. Also located on the bed plate, alongside motor 16a, is a stand 23a for a projector lamp 24a, preferably electrically operated. Substantially level with the filament of lamp 24a, at the upper rear and front sides of its stand, are holders 25a, 26a, for a spherical reflector and a condensing lens, 27a and 28a, respectively.

The condensed rays of light coming from the before named lens 28a, are passed through one or the other of double sets of projection lenses 1b, 2b, depending upon whether the left (1b) or right hand one (2b) thereof is aligned with the set first mentioned. These projection lenses are maintained in place by means of holders 5b, 6b, against side portions 7b, 8b, coextensive with corresponding walls 11b, 12b, that pertain to a housing 13b. Sides 7b, 8b enclose a compartment 14b which overhangs the housing rearwardly, being divided therefrom by a partition 15b. Said holders 5b, 6b, as well as the other one (26a), are each independently adjustable for the proper focusing of their lenses, in conformity with current practice. The housing referred to, comprises a box-like, upright structure, having its vertical open-front 17b, closed by a removable cover 18b that is retained in place through the agency of one or more screws 19b as indicated in Figs. II and IV. By preference and as shown, the lower part of housing 13b is formed integral with the aforementioned carriage 21b, and has at the transverse sides thereof, depending pairs of ears 23b, 24b, of which the first mentioned pair merge together, forming a comparatively heavy flange-like appendage. These ears are bored to slidably take over the before named bars 21a, 22a, thus affording the combined housing and carriage translatory movement on the latter. Travel in either direction of carriage 21b is limited by stops 25b, 26b coacting with lugs 27b, 28b, formed on the ears 23b, 24b respectively. The stops in question, may be in the nature of headless screws having threaded adjustment in bosses 29b, 30b, rising from the aforesaid guide supports 19a, 20a.

Disposed directly in front of the light receiving ends of the projection lens holders 5b, 6b, that is, against their rearwardly turned faces, are gates or guides 31b, 32b, for films F and F1, of ordinary tape-type and provided with standard perforations at their marginal edges, as seen in Fig. III. The companion members to these gates, are formed as adjuncts to a hollow, disc-shaped head 35b, which overlies the open rear end of the compartment 14b. Secured to the outer or rear surface of head 35b, by screws or the like, is a cover plate 36b, having apertures 37b, 38b, therein (Fig. III) and through which apertures the light rays from the condensing lenses reach the images on the films. The shutter that periodically excludes the light from entering the apertures referred to, which may be contained within the head 35b in close adjacency to cover plate 36b, has not been shown, as the same may be of any of the well known kinds now in use for such purposes.

Similarly, no means for intermittently advancing the films, is illustrated on the accompanying drawings, as almost any one of the different varieties of claw movements usually employed to perform this function, is adapted or adaptable to fit the space reserved for it within the said compartment 14b. Obviously, this apparatus in conformity with others having a like object in view, may be operated without a claw-movement, simply by propelling the films continuously at a relatively low rate of speed.

Motion for actuating the shutter as well as the claw-movement just above mentioned, can be conveniently taken from or supplied by a short, horizontal shaft 39b journalled in a bearing 40b, projecting in both directions from the compartment's partition 15b. The rearwardly extending portion of shaft 39b has affixed thereto a worm-gear 41b that is rotated by a worm 42b carried by a vertically arranged spindle 43b. The upper extremity of the latter is guided both axially and laterally in a bearing 44b, held by screws or the like to a wing-like extension 45b offset upwardly from the horizontal bearing 40b, within the compartment 14b (Fig. III). The means for driving spindle 43b is applied to the lower terminal thereof and will be more fully hereinafter described. To the front end of the before named shaft 39b is secured a mitre gear 47b, the teeth whereof mesh with those of oppositely disposed companion gears 49b and 50b, revolved by the former in counterwise directions. Said gears 49b, 50b, are fastened to the apposed inner extremities of spindles 51b, 52b, guided vertically in upper and lower pairs of spaced apart, aligned bearings 53b, 54b, respectively, the latter as shown, being attached to the inside of the housing's rear wall.

Applied to the top and bottom end portions of spindles 51b, 52b, are bevel pinions 55b, 56b, which are in meshing engagement with upper and lower pairs of bevel gears 57b, 58b respectively. The gears in each pair are reversely rotatable around the inner necked down portions 59b of divided although similar stub-axles, one of which 60b, is indicated at the upper left-hand side of Fig. I, and also in Fig. IX. Each of these axles is provided with a collar 61b, integral with, or forced thereonto. Beyond this collar, stub axle 60b is formed with an outwardly projecting, squared shank 62b, adapted to receive thereon, the correspondingly shaped central part of a double flanged film reel 63b, the other reels being numbered 64b, 65b and 66b (Figs. I and III). Said shaft 60b is afforded a bearing near the inner end thereof, in the bottom portion of a hollow, cup-like sleeve 67b, and adjacent the opposite end, in a follower 68b, coacting with the open side of the latter. This follower as represented at the upper left-hand portion of Fig. I, has a hub-shaped projection 69b which is designed to enter the recessed interior 70b of sleeve 67b, being urged outwardly therefrom by a compression spring 71b lodged in this recess. Said sleeve 67b is journalled through the side wall of the housing 11b in an enlarged boss-like protuberance 73b formed thereon. A nut and a flange, 74b and 75b respectively, serve to retain the said sleeve against endwise movement in boss 73b. Flange 75b extends around the open side of the sleeve 67b in abutting relation to the outer face of said boss, while nut 74b which contacts with the opposite face of the boss 73b has threaded engagement with the inner or basal portion of the said sleeve 67b.

Follower 68b although permitted a limited axial play on the axle 60b, is compelled through the agency of a dowel-pin 77b, preferably driven into the aforementioned sleeve, to partake of its rotative movement. Interposed between the inner and outer faces of the before named collar 61b and the follower 68b is a disc 78b of appropriate frictional material. Pressure exerted by spring 71b forces said follower up against disc 78b and the therewith cooperating collar. Rotative motion it will thus be seen, is transmittible from the sleeve 67b through said collar and shank 62b to the film reel 63b. The means for imparting rotation to the said sleeve from the before mentioned bevel gear 57b, comprises in the present embodiment of the invention, a spring urged, sharp-nosed detent 79b that is lodged in a pocket 80b provided for it in sleeve 67b to one side of its recess 70b. The nose or wedge-point of detent 79b is capable of being projected into the path of a notch 81b of like formation provided in the under face of said gear 57b. The notch represented in Fig. X has one side thereof bevelled or inclined as at 82b, in order to enable the same to depress and pass over said detent, leaving the sleeve 67b and its accessories idle, when the said gear is revolved right handedly or clock-wise, but to cause the latter to turn the sleeve in a counter clockwise or left hand direction, e. g., at such times as the driving action takes place intermediate the abrupt or straight sides of the notch and the detent, as will be understood from an inspection of Fig. X. In order to prevent displacement of said detent from its pocket, when the gear 57b is taken off the neck 59b on which it is carried, there is driven into the side of this detent, a dog 83b, which has a restricted movement within a relatively short slot 84b reaching into the pocket 80b through the adjacent outer wall of said sleeve.

From the upper left-hand side of Fig. I and also with respect to Fig. XI, it will be observed that the before named flange 75b which surrounds sleeve 67b is contacted at the side thereof which is uppermost, by the curved under-edge of a pawl 85b. The latter is pivoted about the shank of a screw 86b entering the housing's side 11b. The curve of the edge referred to, is struck with a radius longer than the distance between the periphery of said flange and the axis of screw 86b, and the centre of this radius is by preference located to the right of that of the screw's. As will be seen from the position these parts occupy in Fig. XI, the left side of the pawl's under edge which overhangs the point of contact with the flange 75b somewhat more than the right hand side, is given a slightly flatter curvature. A spring 87b, conveniently composed of a piece of resilient wire, is anchored to the screw 86b, and bears with its other free extremity upon the left, nearly radial edge of the pawl 85b, urging the same against said flange 75b. The advantage resulting from this arrangement is that when the sleeve 67b with its flange is rotated clockwise, i. e. in the direction suggested by an arrow M (Fig. XI), by bevel gear 57b, through the agency of detent 79b, a wedging or crowding action takes place intermediate the contacting edges of pawl 85b and the said flange 75b, sufficient to arrest the motion of the latter and the sleeve connected to it. Contemporaneously with this stoppage of said sleeve, the gear 57b slips idly over the before named detent, leaving the axle 60b unattached, or free to be turned independently and at a slower rate of speed than the said gear. By reason of the fact that the follower 68b presses the friction disc 78b against the collar 61b, which as before stated is fixed to the said axle, a drag or restraint is exerted thereon, serving to retard the rotary motion of the film reel 63b. The advantages of the construction above described are two-fold: First, when the film is commencing to wind upon a reel, the circumferential speed of the latter must be fast enough to take care of the smallest amount of film tape on the reel's core. But as the quantity of the tape increases on a reel and the peripheral velocity of the former is commensurately augmented, the stub-axle with said reel thereon must necessarily slip back, as no more of the film can be wound up than what is fed forwardly to the said reel. Second, while the film is being unwound or taken off a reel, the friction disc impedes the speed of the same, preventing it from giving out the film-tape too fast. From the foregoing it will be understood, that the proper rate of travel and tension on the film is maintained uniform under all conditions.

The construction and arrangement of the other film reels 64b, 65b and 66b, as well as the drives therefor, are identical with the one first described, namely 63b, except that the upper and lower reels 63b and 65b at one side, are revolved by their respective gears in a direction counter clockwise to the reels 64b, 66b located at the opposite side of the housing 13b. It is also to be noted in conjunction herewith, that the friction pawls which coact with the sleeve flanges pertaining to the film reels 63b and 66b, bear upon the far side of these flanges, while the other pawls impinge upon the near side of the flanges cooperating with the reels 64b and 65b. Or stated in other words, the springs for the pawls at one side of the housing, bear upon opposite edges of their said pawls in order to cause the latter to exert braking actions in opposite directions, depending upon whether the film is unwound from the top or bottom reels.

Guide sprockets 89b, 90b, 91b and 92b, composed of laterally spaced apart toothed rims, have the teeth thereof in engagement with the edge perforations in the film tapes. Said sprockets are also disposed in pairs adjacent to the underside of the top and bottom reels, for each set thereof. As these film sprockets are alike, it will suffice to describe one of them. Thus it will be seen from an inspection of Fig. 1 that sprocket 89b is affixed to the outer extremity of a stub-shaft 93b journalled in a bushing 94b suitably retained, as by driving it into a boss 95b which is formed with the housing's wall 11b. To the inner end of shaft 93b is secured a mitre gear 96b, having meshing engagement with a like companion gear 97b that is fixedly mounted on the vertically rotatable spindle 51b, hereinbefore referred to. The lower sprockets 91b, 92b, are likewise driven by mitre-gears intermeshing with a similar gear 98b attached to the nether spindle 52b, previously alluded to. It is obvious from the arrangement shown of the aforesaid gears, that the sprockets on either side of the housing are revolved in the same direction as the film reels.

In contact with or bearing upon the stretches of film running over the apposed faces of the aforementioned sprockets, intermediate their toothed rims, are shoes 100b, one for each sprocket. These shoes as shown in Fig. II are pivotally connected to the sides of the housing, being maintained in their operative positions by flat springs 101b, and serve to prevent the film-tape from disengagement with the sprocket teeth. As will be observed, each film runs on or off a reel at the side thereof facing the front of the machine, and leads straight therefrom to the corresponding side of the sprockets, thence between the latter and their shoes, and finally is formed into loose bights or loops entering the guides interadjacent the members composing the hereinabove mentioned gates 31b—32b. The bights in question, are of sufficient length to afford flexibility and permit the film to gradually accommodate itself to changes in the direction of the travel thereof, in order to protect the same from being unduly strained or ruptured.

The previously referred to, vertical spindle 43b, by means of which motion is transmitted to various shafts and gears contained within the housing 13b, has, as before stated, its upper end guided in a bearing 44b. To the lower extremity of the aforesaid spindle is secured a spiral gear 103b the teeth whereof mesh with those of a similar gear 1c having splined engagement with a horizontally disposed shaft 3c (Fig. V). The latter is both slidably and revolubly supported in the left hand ear or flange 23b, belonging to the housing-carriage 21b, and is also journalled in bearing bosses 5c—6c, respectively formed with side walls 7c—8c of a box-like enclosure 9c, which extends up from the base-plate 15a. The right hand wall 8c and also a top or covering wall 10c of this box (Fig. IV), are by preference made detachable from the front and rear walls 11c, 12c, respectively, to facilitate machining thereof, as well as to afford ready access to the mechanisms located interiorly of said box 9c. At 105b is indicated a keeper, fastened in any suitable manner to the inner side of the flange 23b, for the purpose of retaining gear 1c in proper coacting relation with its companion 103b, irrespective of the back and forth travel of the said carriage on the before named guide bars 21a, 22a.

Within the said enclosure box, are mounted to revolve loosely on shaft 3c, a pair of spiral gears 15c, 16c, held in spaced relation and having clutch teeth on their inner apposed hub portions. The shaft 3c is maintained in axial alignment by collars 19c, 20c, fastened thereon and abutting against the bearings 5c and 6c respectively. A centrally and circumferentially grooved member 21c of shorter over all length than the distance between the clutch teeth on the hubs of said gears 15c, 16c, is slidably but non-rotatively carried on said shaft 3c intermediate the last named gears. The ends or transverse sides of this member are also provided with clutch teeth capable of cooperating with the side dentations on the gears just mentioned, when member 21c is shifted into engagement with either set thereof. Meshing with the gear teeth on the underside of the gears 15c, 16c, are similar teeth on the upper face of coacting spiral gears 23c, 24c respectively. The latter are each affixed to separate spindles, numbered 25c, 26c respectively, and these spindles have their end portions journalled in the front and rear walls of the box 9c. In close proximity to the rear wall 12c, there are secured to the aforesaid spindles, pinions 27c, 28c, having helically shaped teeth and driven by a correspondingly toothed gear 29c, fixedly mounted on the adjoining extremity of the motor-shaft 17a. This, the main driving shaft, is disposed in a plane higher than that wherein spindles 25c, 26c are situated, which it will be comprehended from what has been stated hereinbefore, are located at a level below the shaft 3c (Figs. I and V). It will also be noted from these figures that the teeth on the driven spiral gears 15c, 16c, have different angular inclinations, one with respect to the other, thus causing them to be revolved oppositely by their drivers 23c, 24c. From the foregoing it will readily be seen, that if the clutch member 21c is brought to engage the teeth at the sides of either of the gears 15c, 16c, the direction of rotation of this member as well as that of the shaft 3c will be in conformity with that of the last named gears.

The means for actuating the member 21c, i. e. moving the same from its middle or neutral position, one way or the other, so that the dentations thereon grip into those on the sides of either of the gears 15c, 16c, may consist as depicted in Figs. I and V, of a forked element 31c. The free or outer ends of the forked arms of this element, are furnished with headed studs 32c adapted to enter the member's peripheral groove. As will be perceived from Fig. I, the heads of the aforementioned studs are somewhat smaller than the width of the groove spoken of, so that a slight play is permitted therebetween. This play affords a certain latitude for the opposite sets of clutch teeth to align themselves, should they happen to strike with the high points of their teeth directly upon, or against one another. At the junction of its arms, element 31c is formed with a hub 33c, which if desired, can be fastened to a rod 35c, by pinning it thereto, or in any other convenient manner. Rod 35c as most clearly represented in Fig. V has the right hand portion thereof slidably received in the side walls of box 9c. Interposed between said walls 7c, 8c, hub 33c and a collar 36c on said rod, are compression springs 37c, 38c respectively, taking around the latter. The springs in question, tend to maintain the element 31c and the therewith associated member 21c, in neutral or inoperative position. Exteriorly of the enclosure box, there are adjustably secured to the left hand portion of the rod 35c, collars 39c, 40c, respectively, which collars are disposed in the path of the flange 23b, depending from the housing-carriage 21b. As shown at the left side of Fig. V, the outer face of flange 23b has been brought up against collar 39c, in the present embodiment of the invention at the same extremity of the rod 35c, thus exerting a pull on the latter, which in turn acts to draw the member 21c into clutching engagement with the gear 15c. The last named gear, as before pointed out, will through the agency of the said clutch member rotate the shaft 3c in one direction, which motion is transmitted by way of the intermeshing spiral gears 1c, 103b and vertical spindle 43b to the shafts and bevel gears serving to operate the film reels. Immediately the said flange 23b moves away from the collar 39c, the previously compressed spring 37c, restores the clutch member 21c to its idle, median position, stopping the rotations of shaft 3c. Further travel of the carriage 21b towards the right, causes the inner face of the flange like appendage 23b to strike against the other external collar 40c, and impart a limited translatory movement to the rod 35c in the opposite direction, compressing the right hand spring 38c, and contemporaneously bringing the member 21c into engagement with gear 16c. The rotative motion conveyed to shaft 3c, in accordance with what has been recited hereinbefore, being thus reversed, until the pressure imposed on said spring 38c is released, when the same returns the clutch member to its original state of inoperativeness.

To the transversely arranged spindles 25c, 26c, are secured in conformity with the spiral gears 23c, 24c, thereon, another pair of similar gears 41c, 42c, equidistantly spaced from the former. Said gears 41c, 42c, have their teeth in mesh with those on another set of spiral gears 43c, 44c, kept at an appropriate distance apart, while freely rotatable on a shaft 46c. The latter, like the other longitudinally disposed shaft 3c, has its bearings in the left and right hand side walls of the box structure 9c, being held from endwise movement therebetween, by collars 47c, 48c, contacting with the inner faces of bearing portions embodied with the walls 7c, 8c, respectively. Said gears 43c, 44c, have their opposed sides provided with clutch teeth capable of being engaged by companion dentations formed on a member 49c, corresponding to the first named clutch member 21c and operable in an analogous manner by an actuator element 50c. The outer or left hand portion of shaft 46c which comprises a screw of enlarged diameter, as denoted at 51c, engages an internally threaded sleeve 52c. Preferably and as shown, this sleeve is supported on a circumferential ledge 53c that intervenes between the inner, spaced apart, bottom walls of cylindrical pockets 55c, 56c, which are recessed into the opposite faces of the ear 23b, above mentioned. The sleeve referred to is provided with rim-like abutments 57c, 58c, of which the former desirably is in the nature of a nut threaded onto the outer or left hand end of said sleeve. Lodged in pockets 55c, 56c, between the internal ledge 53c and the abutments 57c, 58c, are compression springs 59c, 60c. By virtue of the arrangement described, the said sleeve is held in a floating manner, relatively to the said flange 23b, being thus afforded a slight movement therein. From the enlarged view Fig. VIII, it will be noticed, that the means for limiting not only axial displacement of the sleeve 52c but also preventing the same from rotating, may conveniently consist of a stud 61c, having its inner reduced point in engagement with an opening 62c, which may be of elongated character and formed in the side of said sleeve. A nut 63c applied to the stud's outer end, locks it from becoming loose, a portion of this nut being discernible in Fig. II.

As one of the advantages accruing from the use of the floating sleeve, it may be mentioned that jerks and shocks incidental to starting and stopping or reversal in the translatory motion of the carriage 21b, by means of the screw 51c, through coaction of the clutch member 49c with one or the other of the gears 43c, 44c, as well as disengagement of said member from the latter, is eliminated. An additional advantage is that sufficient energy can be stored up in the compressed springs 59c, 60c, and released therefrom, to bring the housing-carriage 21b with its lugs 27b, 28b firmly against the stops 25b, 26b to locate said carriage in either terminal position thereof, notwithstanding that the cooperating dentations on the member 49c and gears 43c, 44c, may fail to effect intimate registration at the outset of their clutching engagement. Or expressed in other terms, the sleeve in question serves as a compensator to rectify disalignment of the interengageable clutch teeth, particularly at such times as the housing carriage is forced into contact with its end stops.

In the upper middle portion of Fig. VI, is represented in detail, the means for maintaining the spiral gears 43c, 44c, in spaced axial alignment on the shaft 46c, while permitting the former to revolve freely in counterwise directions around the latter. The means referred to, may advantageously comprise, a pair of split-rings 65c, 66c, made of resilient material, such as spring steel. The inner, or first named ring 65c, by preference consists of a lighter gauge wire than the outer ring 66c, in view of the fact that the inner ring does not have to withstand as much pressure, as the outer one, which has to resist the full force or impact of the clutch member 49c against the gear 44c. The aforesaid split and self-clamping rings, are readily slipped endwise over the shaft 46c, snapping by their inherent elasticity into grooves provided therefor in the said shaft, on opposite sides of the gears which they are intended to retain in position. The grooves spoken of, are slightly deeper than half of the thickness or diameter of the wire stock from which the rings are formed, so that the latter cannot easily be dislodged from the grooves, except by an extraneously applied implement. It is obvious that the other set of gears 15c, 16c, on shaft 3c, can also be retained in place by similar expedients, as those just above described. The companion gears, 43c—44c and 23c—24c, as before stated, are fixedly held upon their spindles 25c, 26c, by taper pins or other convenient fitments. The means for causing the clutch member 49c to transmit the rotations imparted to it by the dentations on either one of the gears 43c, 44c, may be on the order of a key 67c lodged in a suitable keyway provided therefor in the said shaft. While not specifically shown, the same expedient may also be employed for the other member 21c.

The shifter element 50c which as mentioned hereinbefore, actuates the clutch member 49c, is provided with an extended hub 69c, capable of a predetermined translatory movement upon a rod 70c. The hub in question, has formed in the near or front side thereof, recesses 71c, 72c and 73c, located at certain distances apart. Rod 70c is slidably sustained adjacent its ends, in the detachable side wall 8c, pertaining to the enclosure 9c, and on a ledge 74c embodied with the flange 23b, belonging to the carriage 21b. The ledge last named intervenes between the inwardly facing side of the said flange and the bottom of an outwardly turned pocket 75c. At the left hand extremity of rod 70c, which passes axially through pocket 75c, is affixed a collar 76c, and intermediate the latter and the bottom of said pocket is interposed a coil spring 77c, tending when compressed by the carriage 21b moving leftward, to store up energy putting the rod 70c under tension.

As illustrated in Figs. V and VI, recess 73c is occupied by the reduced inner point of a plunger 15d, hereinafter more fully referred to, which plunger serves to detain the hub 69c and the thereby controlled member 49c quiescent in its mid-position. It will be comprehended that immediately plunger 15d is retracted from the said hub, the same is drawn leftwise by the spring pulled rod 70c. And, in order to enable the latter to move the hub along with it, another collar 79c fastened to the said rod in close contiguity to the hub's right hand side, is arranged to exert a pushing action thereon. The action just described, results in the engagement of the clutch teeth on the member 49c with those on the gear 43c, which sets the screw 51c revolving in the desired direction, conjointly compelling the housing carriage to reverse its travel. Synchronously with the clutching of the member and gear referred to, a spring-urged plunger 81c is projected into the first named recess 71c in hub 69c holding the same locked in the left hand position thereof. Another similarly impelled plunger 82c, is adapted to have its point enter the second recess 72c and lock the aforementioned hub so as to hold it immovable when the clutch member is over as far to the right as it can go, in engagement with the other gear 44c. From what has been stated hereinabove, it will be seen, that the hub actuated clutch member is positively retained in either of its operative or end positions, and is also held inoperative intermediately of the latter.

Interposed between the left hand side of the hub 69c and a sleeve-like collar 83c, loosely held to the rod 70c, is a compression spring 84c. From Figs. V and VI, it will be perceived that collar 83c is provided lengthwise thereof with a notch 85c which takes around and is guided by a pin 86c driven into said rod. The aforesaid arrangement enables the collar 83c to yield along the rod 70c when the left hand ear or flange 23b of the housing carriage pushes thereagainst, still without becoming disengaged from pin 86c which acts as a stop to limit the leftward sliding movement of the said collar under the influence of spring 84c. At such times as the adjacent flange of the carriage 23b has caused the collar 83c to compress its spring, the same is capable of storing up sufficient energy to shift the combined hub and element (69c and 50c) and the thereby controlled clutch member 49c into engagement with the right hand gear 44c, when plunger 81c is pulled out of the recess 71c in the said hub. Coincidentally with the clutching of the teeth on this member with those on the gear last referred to, the other locking plunger 82c snaps into the middle recess 72c, holding the hub from moving back, thus preventing disengagement of the clutch teeth in question, in the manner hereinbefore pointed out.

The means for withdrawing the locking plungers 81c, 82c, from their recesses, consists in the present embodiment of the invention, of a T-shaped lever 87c, that is pivoted on the shank of a screw 88c received in the bottom portion of a shelf-like ledge 89c which as shown, is depressed into the upper part of the front wall 11c of enclosure box 9c. This lever is furnished with sidewise offset arms 91c, 92c, adapted to bear against the far side of dogs 93c, 94c, respectively. The latter extend upwardly from the aforementioned plungers, being guided in elongated openings 95c, 96c, respectively, provided in the bottom of shelf 89c. The openings mentioned communicate with cavities 97c, 98c, respectively containing the plungers 81c, 82c and their projecting springs. With particular reference to Fig. VI, it will be observed that plunger 82c stands in retracted position relatively to the recess 72c, while the other plunger 81c although unaffected or released by the lever's arm 91c, is riding on the adjacent surface of hub 69c, by virtue of said arm having moved away from dog 93c. As soon as the said hub is drawn leftwise by the spring actuated rod 70c, the last mentioned plunger under the influence of its spring will be projected into the recess 71c.

In order to liberate the hub 69c so as to engage or disengage the clutch member 49c in properly timed relation to the movements of the housing-carriage 21b, the outer end of lever 87c has connected to it, one terminal of a longitudinally extended link 101c. The free, left hand extremity of the latter is loosely supported within a guide 103c formed with the left flange 23b of the said carriage. To the extremity referred to and also on the intermediate portion of link 101c, are affixed abutment collars 105c, 106c, which are respectively disposed in the path of the flange 23b of the moving carriage. In the position of the parts represented in Fig. V, the flange 23b has come into contact with collar 105c and pulled the same together with the link 101c over towards the left, thus tilting the lever 87c as shown in this figure and also in Fig. VI, preparatory to plunger 81c locking hub 69c with the member 49c clutching gear 43c. It stands to reason that the pushing of the inside of flange 23b against collar 106c swings the lever 87c oppositely to the position of the parts in the aforesaid figures, when also, the plunger 82c is made ready to lock the clutch member in its extreme right hand position.

The member 49c is held in engagement with either one of the gears 43c, 44c, only when the carriage 21b is being moved to shift one or the other of the films F, F1 in front of the condensing lens 28a. While the housing carriage is in motion, the first mentioned clutch member 21c is retained in its intermediary, idle position by the springs 37c, 38c. But at such times as said member 21c clutches the left or the right hand gear 15c, 16c, respectively, the member 49c controlling the carriage translating screw 51c, is held inoperative by the hereinbefore referred to main locking plunger 15d. The latter is retracted by mechanism connected up with shaft 3c which transmits motion to the gears and spindles propelling film-tapes F and F1 alternately in opposite directions.

It will be noted from an inspection of Figs. V and VI, that plunger 15d is housed within a barrel 16d which may be formed with the front wall 11c, in spaced relation, to the right of shelf 89c. The point of said plunger is impelled rearwardly outward of barrel 16d by a helical spring 17d. At the forward end of the plunger's shank portion, there is secured a collar 18d, between which and the wall 11c is lodged the free bifurcated terminal 19d of a lever arm 20d. The opposite or inner extremity of this arm is hingedly coupled to a lug 21d that is provided at one side of a collar 22d loosely mounted on the exterior front end of a spindle 23d, intermediate another collar 24d and a disc 25d. Both of the last named parts are fixed a given distance apart, to the said end of spindle 23d. The latter is rotatably supported in bearings afforded the same in the front and rear walls of the enclosure box 9c.

From the outer face of disc 25d, projects forwardly a protuberance 26d which is adapted during the rotative movement imparted to the disc, to cooperate with oppositely bevelled cam surfaces 27d, 28d cut into the inwardly facing side of lever 20d. When this protuberance is brought into contact with either one of the aforementioned cam-surfaces, depending, of course, in which direction the disc 25d is being rotated, said lever is oscillated from lug 21d as a fulcrum, pulling with its forked end 19d against the underside of collar 24d. The action thus produced, withdraws the inner extremity of plunger 15d from its recess in the hub 69c. The latter as before pointed out, forthwith will be shifted either to the left or to the right, depending upon which one of the springs 77c, 84c was initially put under stress by the carriage 21b. While only one protuberance 26d has been indicated on the drawings hereto annexed, it will be observed, that a pair of them may be carried from the face of the disc 25d, thus reducing the intervals between which the plunger 15d is retracted. By preference, the said protuberance consists of a fitting having a hardened head with a shank like appendage, which for convenience sake, can be forced into suitable openings 29d provided therefor in the face of the disc adjacent to its periphery. Retraction of the said plunger is timed to take place immediately the last view or picture on the film under exposure is being projected.

The before named spindle 23d is prevented from endwise displacement, by collars 31d and 32d, secured thereto in contiguity to its bearings, in the front and rear walls, 11c, 12c respectively. In Figs. I and V, it is depicted that a worm wheel 33d is affixed to the said spindle, between the collar 32d and the shaft 3c which is located at a level higher than the spindle. The wheel referred to, is driven by a worm 35d attached to a vertical shaft 36d which is journalled in bearings 37d, 38d respectively formed with the base-plate 15a, and fastened to the inside of the rear wall 12c. To shaft 36d, above worm 35d, is fixedly held a worm-gear 39d, which is rotated by a worm 40d that is secured to the shaft 3c, intermediate the thereon revolving right hand spiral gear 16c and the collar 20c fastened to the same end of the said shaft. Adjacent to the lower extremity of the vertical shaft 36d is affixed a collar 41d which abuts against the foot bearing 37d, while alignment in an upward direction is maintained by the upper side of worm-gear 39d contacting with the under face of the top bearing 38d. All of the before named bearings, gears, clutches, and actuating members, can be kept running in a bath of lubricant contained in the box 9c, so as to reduce wear and friction, besides minimizing noise of operation.

From the foregoing description it will be comprehended, that while the electric motor is energized, its gear 29c drives the helically toothed pinions 27c, 28c and their spindles 25c, 26c continuously. The latter uninterruptedly rotate the pairs of spiral gears 23c—15c, 41c—43c, at the left hand side, in one direction, and the other pairs 24c—16c, 42c—44c, oppositely, by virtue of the tooth angles of the first mentioned group being reversely disposed to those on the latter group of gears. The clutch member 21c transmits motion clockwise or anti-clockwise to shaft 3c, conditioned upon which one of the gears 15c or 16c is clutched by the member 21c.

The intermeshing gears 1c and 103b convey the revolutions of shaft 3c to the vertical spindle 43b, which in turn imparts the same to the fore and aft extending short shaft 39b, by way of the worm and gear 41b, 42b, respectively. The bevel gear 47b at the opposite end of the last named shaft transmits the motion to the apposed companion gears 49b and 50b on the spindles 51b and 52b, respectively. Bevel pinions 55b, 56b, at the top and bottom extremities of the aforesaid spindles and in meshing engagement with the upper and lower oppositely paired bevel gears 57b, 58b, operate to revolve the stub axles 60b and the thereby carried film reels 63b—65b in one direction, and the other reels 64b—66b in a direction counterwise thereto. The intermediate upper and lower mitre gears 97b and 98b, on the last named spindles and consorting with the companion gears 96b, and the inner, spaced apart ends of stub shafts 93b, act to turn the sprockets 89b—91b and 90b—92b in concurrent directions with the reels at the sides of the housing 13b, where these sprockets are situated.

The periods of dwell which are afforded the housing carriage 21b, at the terminals of its travels on the guides 21a, 22a, not only locates one or the other of the projecting lenses in focal alignment with the stationary condensing lens, but effects also the engagement of the clutch member 21c with the side dentations on the left or right hand driving gears 15c and 16c respectively. The position assumed by the parts on the accompanying drawings, represents that the right hand projecting lens 2b aligns with the condensing lens 28a in rear thereof. The film F1 under exposure, in accordance with the arrow marked Y (Fig. I) runs downwardly or off the upper reel 64b and onto the lower reel 66b, while the other film-tape F is propelled oppositely. At such times as these conditions are reversed, that is, the lens 1b is made to register with the one in front of the light source, and the housing carriage stands over or above the gear enclosing box 9c, then it is the left hand film F which winds and unwinds in a downward direction. Instantly translation of carriage 21b commences and the member 21c is compelled by its springs 37c, 38c to disengage the clutch dentations on either one of the gears, 15c, 16c, the movements of both films cease until said carriage is again brought to rest.

During the interval of rest or pause of the housing carriage, while the shaft 3c is driven by one or the other of the sidewise dentated gears 15c, 16c, through the medium of the therewith coacting clutch member, the knock-out instrumentality, comprising the disc-carried protuberance 26d, is revolved relatively slowly by means of the train of mechanism including the worm, worm-wheel and spindle, 40d, 39d and 36d, respectively, which convey the motion through worm, worm-gear and spindle, 35d, 33d and 23d, respectively, to the disc 25d. The moment the protuberance-controlled lever 20d, retracts the main plunger 15d, the then liberated hub 69c under the influence of either one of springs 77c or 84c, shifts this hub and the thereby actuated clutch member 49c so as to engage the side dentations on one or the other of the gears 43c, 44c, which as before pointed out starts the screw 51c turning clockwise or anti-clockwise, for translation of the carriage towards the left or right, as the case may be. So soon as proper clutching engagement has been effected by the member 49c, for instance with gear 43c of the last mentioned pair of gears, the secondary plunger 81c will enter its coaligning recess in the hub 69c, locking the latter in the left hand position thereof. The other plunger 82c will perform the same function in the opposite position of the said hub. The spring floating sleeve 52c with which coacts the carriage-translating screw 51c is capable in either end position of said carriage to compensate for as well as to rectify disalignment between the said dentations on the member 49c with those on either one of the gears 43c, 44c.

While a certain preferred embodiment of this device has been shown and described, it will be understood that changes in the form, arrangements, proportions, sizes and details thereof may be made, without departing from the scope of the invention as defined by the appended claims.

Having described my invention, what I desire to secure by Letters Patent and claim is:—

1. In a picture projector, a support, pairs of film storage and film take-up reels carried thereby, mechanism for driving the pairs of said reels in counter-wise directions, to expose one film and rewind the other, a shaft connected up with said mechanism, positively driven oppositely rotatable clutch elements revolvable around said shaft, and a clutch member non-rotatably mounted on the shaft capable of being shifted thereon to engage one or the other of said elements, for reversing the shaft to control the direction of movement of the films.

2. In a picture projector, a movable support, double pairs of film storage and film take-up reels sustained therefrom, mechanism adapted to drive the pairs of said reels in counterwise directions to expose one film and rewind the other, a shaft connected up with said mechanism, oppositely rotatable clutch elements loosely revolving around said shaft, a shiftable clutch member non-rotatably mounted on the shaft, and means actuated by the movement of said support serving to shift said member into engagement with one or the other of said elements for reversing the shaft to control the direction of movement of the films.

3. In a picture projector a support, double sets of film storage and film take-up reels disposed in pairs at the sides thereof, mechanism carried by said support adapted to drive the reels of one pair in one direction and to simultaneously drive those of the other pair in the opposite direction to expose one film and rewind the other, a shaft connected up with said mechanism for rotating the same in one direction or the other, positively driven oppositely rotating gears revoluble loosely around said shaft in spaced apart, fixed locations thereon, clutch elements provided at the apposed sides of said gears, a member formed with dentations capable of coacting with said elements, said member being non-rotatably mounted on the said shaft in slidably interposed relation between the elements, and means for shifting the said member into engagement with one or the other of the said elements to control the direction of rotation of the shaft and the movement of the films.

4. In a picture projector, including a movable support, sets of film storage and film take-up reels carried in pairs at the sides thereof, mechanism carried by said support adapted to drive the reels of one pair in one direction and to simultaneously drive those of the other pair in the opposite direction to expose one film and rewind the other, a shaft connected up with said mechanism for rotating the same in one direction or the other, positively driven oppositely rotating gears revolvable loosely around said shaft, said gears being provided with clutch elements at their inner apposed sides, a similarly formed member non-rotatably mounted on the shaft, being slidable thereon intermediately of said elements, a device operated in timed relation with the movements of the housing serving to shift said member into engagement with one or the other of the elements to cause reversal of the motion transmitted to the mechanism by the said shaft, and means acting during movement of the support to hold the member disengaged from the said elements.

5. In a picture projector, a light source, a support movably guided with respect thereto, sets of film storage and film take-up reels carried in pairs from said support, mechanism for driving each pair of said reels alternately in counterwise directions, a device for moving the support on its guide to present the film on either set of reels to said light, an instrumentality operatively connected up with said device capable of transmitting periodically reversed motion to the support, primary detent means for locking said instrumentality in inoperative position, secondary detent means adapted to retain the instrumentality in operative position, means for retracting said secondary detent actuated in timed relation with the movements of the said support, and other means for unlocking said primary detent means controlled by said mechanism.

6. In a picture projector, a movably guided film-reel support, stops against which the latter abuts at the ends of its travel, a screw-threaded spindle adapted to impart motion to said support, mechanism capable of transmitting rotation in opposite directions to said spindle, a sleeve having a limited play in the support arranged to be engaged by said threaded part of the spindle, and yielding means interposed between the sleeve and support for opposing the play of said sleeve in each direction and serving to limit the pressure brought against the stops.

7. In a picture projector, a light source, a condensing lens at the front thereof, a support movably supported forwardly of said light, sets of film storage and film take-up reels carried in pairs from the sides of said support, mechanism therein adapted to drive each pair of said reels alternately in counterwise directions to expose one film and rewind the other, a separate projecting lens for each individual film, means for periodically moving the support to present either projecting lens in focal alignment with said condensing lens, and film guides reaching rearwardly of the support opposite said projecting lenses and capable of being brought in to registry with the condensing lens.

8. In a picture projector, paired sets of film storage and film take-up reels carried on reel spindles, mechanism for imparting alternately reversed motion to each pair of said reels to expose one film and rewind the other, said mechanism comprising rotatably mounted members in each of which a reel-driving spindle is journalled, a driven element loosely mounted on each spindle, a detent carried by each member in coacting relation to said element, said detent serving to transmit rotation in one direction from the element to the member but leaving the same unaffected when turning oppositely, and means for conveying the motion from the said member to said spindle.

9. In a picture projector, paired sets of film storage and film take-up reels carried on reel spindles, mechanism for imparting alternately reversed motion to each pair of said reels to expose one film and rewind the other, said mechanism comprising rotatably mounted members in each of which a reel driving spindle is journalled and capable of revolving independently or conjointly therewith, a driven gear mounted loosely near one end of each spindle, a detent carried by each member, said detent having clutching engagement with the corresponding gear and adapted to transmit rotation in one direction therefrom to the member, and a slip drive friction element serving to convey the motion from the said member to the said spindle and the thereby driven film reel.

10. In a picture projector, paired sets of film storage and film take-up reels carried on reel spindles, mechanism for imparting alternately reversed motion to each pair of said reels to expose one film and rewind the other, said mechanism comprising rotatably mounted members, in each of which a reel driving spindle is journalled and capable of revolving independently or conjointly therewith, a driven gear mounted loosely near one end of each spindle, a detent carried by each member, said detent having clutching engagement with the corresponding gear and adapted to transmit rotation in one direction therefrom to the member, a slip drive friction element serving to convey the motion from the member to the spindle, and braking means coacting with the said member to prevent back rotation thereof without interfering with spindle movement.

11. A projector for alternately and successively projecting pictures from two independent reels of film, comprising a single light source, independent film storage and film take-up reels, one each for each film, a movably mounted body supporting said reels, projecting lenses carried by the body, one for each film, a driving motor, motor driven, film-transferring means carried by the body and operative, when the body and parts carried thereby are disposed to place one film and the corresponding lens in projecting position in front of the light source, for transferring this film from the storage reel past the lens and onto the take-up reel, body-carried, motor driven means for simultaneously transferring the other film from its take-up reel to its storage reel, and body shifting means driven from the same motor for shifting the body at the end of the film transferring operations to place the other film and associated parts in projecting position, whereupon the film is carried past the lens for projection and the other film is rewound onto the storage reel.

12. A projector as claimed in claim 11, characterized in that the motor positively drives the take-up reel for one film and the storage reel for the other film through a one way driving connection and a frictioned slip clutch associated with each reel and acting on reversal of the film transferring means to prevent over run of the reel off which the film is being taken.

13. A projector as claimed in claim 11, characterized in that the starting of the body shifting means is responsive to the transferring of a predetermined length of film.

14. A projector as claimed in claim 11, characterized in that the reversing of the film transferring means is effected by a reversing clutch controlled by the shifting of the body and held open during the movement of the body.

15. A projector as claimed in claim 11, having means for automatically locking the body in either extreme position and disconnecting it from the motor drive.

16. A projector for alternately and successively projecting pictures from two independent reels of film, comprising a single light source, independent film storage and film take-up reels, one each for each film, a movably mounted body supporting said reels, projecting lenses carried by the housing, one for each film, a driving motor, motor driven, film-transferring means carried by the body and operative, when the body and parts carried thereby are disposed to place one film and the corresponding lens in projecting position in front of the light source, for transferring this film from the storage reel past the lens and onto the take-up reel, body-carried, motor driven means for simultaneously transferring the other film from its take-up reel to its storage reel, a rotatable shaft having a screw threaded connection with the body for shifting it, reversibly operated motor driven elements, clutching means coupled with the shaft and held out of engagement with either of the motor driven elements until a predetermined length of film has been transferred, means for thereupon releasing the clutching means, and means biased during one shifting operation for actuating the clutching means to return the body.

17. A projector as claimed in claim 16, wherein the shaft and body are interconnected by a double acting shock absorber adapted to hold the body in either extreme position against fixed stops and to prevent over-straining the connections.

HERMAN C. SCHLICKER.